(12) United States Patent
Suzuki et al.

(10) Patent No.: US 7,390,474 B2
(45) Date of Patent: Jun. 24, 2008

(54) POROUS MATERIAL AND METHOD FOR MANUFACTURING SAME, AND ELECTROCHEMICAL ELEMENT MADE USING THIS POROUS MATERIAL

(75) Inventors: Masa-aki Suzuki, Osaka (JP); Hidehiro Sasaki, Moriguchi (JP); Yasunori Morinaga, Suita (JP); Masahiro Deguchi, Hirakata (JP); Yuka Yamada, Nara (JP); Nobuyasu Suzuki, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1008 days.

(21) Appl. No.: 10/834,078

(22) Filed: Apr. 29, 2004

(65) Prior Publication Data
US 2004/0202602 A1   Oct. 14, 2004

(51) Int. Cl.
*C01B 31/02* (2006.01)
(52) U.S. Cl. ...................... 423/445 R; 521/50
(58) Field of Classification Search ............. 423/445 R; 521/52
See application file for complete search history.

(56) References Cited

U.S. PATENT DOCUMENTS

| 6,261,469 | B1 | 7/2001 | Zakhidov et al. |
| 2002/0187896 | A1 | 12/2002 | Ryoo et al. |

FOREIGN PATENT DOCUMENTS

| JP | 58-76142 | 5/1983 |
| JP | 4-270108 | 9/1992 |
| JP | 4-270109 | 9/1992 |
| JP | 5-58682 | 3/1993 |
| JP | 05-105513 | 4/1993 |
| JP | 5-105513 | 4/1993 |
| JP | 10-324579 | 12/1998 |
| JP | 2000-154273 | 6/2000 |
| JP | 2001-233674 | 8/2001 |
| JP | 2001-354406 | 12/2001 |
| JP | 2002-29860 | 1/2002 |
| JP | 2003-34516 | 2/2003 |
| WO | WO 00/21905 | 4/2000 |

OTHER PUBLICATIONS

Jong-Sung Yu, et al., "Fabrication of Ordered Uniform Porous Carbon Networks and Their Application to Catalyst Supporter", Journal of the American Chemical Society, Aug. 14, 2002, vol. 124, No. 32, pp. 9382-9383.

Sang Hoon Joo et al., "Ordered Nanoporous Arrays of Carbon Supporting High Dispersion of Platinum Nanoparticles", Nature, 2001, vol. 412, pp. 169-172.

Shinae Jun, et al., "Synthesis of New, Nanoporous Carbon With Hexagonally Ordered Mesostructure", Journal of the American Chemical Society, 2000, vol. 122, No. 43, pp. 10712-10713.

Zuojiang Li, et al., "Silica Gel-Templated Mesoporous Carbons Prepared From Mesophase Pitch and Polyacrylonitrile", Carbon, 2001, vol. 39, pp. 2077-2088.

Yu et al., "Fabrication of Ordered Uniform Porous Carbon Networks and Their Application to Catalyst Supporter", *Journal of the American Chemical Society*, Aug. 14, 2002, vol. 124, No. 32, pp. 9382-9383.

Joo et al., "Ordered Nanoporous Arrays of Carbon Supporting High Dispersion of Platinum Nanoparticles", *Nature*, 2001, vol. 412, pp. 169-172.

Jun et al., Synthesis of New, Nanoporous Carbon with Hexagonally Ordered Mesostructure, *Journal of the American Chemical Society*, 2000, vol. 122, No. 43, pp. 10712-10713.

Li et al., "Silica gel-templated mesoporous Carbons Prepared from Mesophase Pitch and Polyacrylonitrile", *Carbon* 2001, Vo. 39, pp. 2077-2088.

"Enhancing the Activity of Fuel-Cell Reactions by Designing Three-Dimensional Nanostructured Architectures: Catalyst-Modified, Carbon-Silica, Composite Aerogels", Michele L. Anderson et al., Nano Letters, vol. 2, No. 3, 2002, pp. 235-240.

"The Study of Carbon Nano-Composite Materials Based on Aerogel Skeletal", K. Xie et al., Key Engineering Materials, vols. 161-163, 1999, pp. 427-430.

*Primary Examiner*—Stuart Hendrickson
(74) *Attorney, Agent, or Firm*—McDermott Will & Emery LLP

(57) ABSTRACT

Conventional porous carbon materials obtained by carbonizing an organic gel were prone to shrinkage during their manufacture, in the course of which the density rose and the specific surface area decreased. Another problem was that density and specific surface area were difficult to control after an organic gel had already been formed. In the present invention, a carbon material with a large specific surface area is formed by forming a composite porous material having a reticulated skeleton and composed of a dry gel of an inorganic oxide, and taking advantage of the reaction of this dry gel of an inorganic oxide as a structural support. In one method, a carbon material is formed in this reticulated skeleton in a state in which the characteristics of a dry gel of an inorganic oxide with a large specific surface area are maintained. In another method, the specific surface area of a carbon material is further increased by removing the inorganic oxide of the reticulated skeleton in which the carbon material was formed.

6 Claims, 9 Drawing Sheets

POROUS MATERIAL AND METHOD FOR MANUFACTURING SAME, AND ELECTROCHEMICAL ELEMENT MADE USING THIS POROUS MATERIAL

TECHNICAL FIELD

The present invention relates to a carbon-based porous material used in electrode materials for cells and capacitors, supports for catalysts, and so forth, and to a method for manufacturing this material. More particularly, it relates to an electrochemical element such as a fuel cell, air cell, water electrolysis apparatus, gas sensor, contaminant gas removal apparatus, and so forth in which this porous material is used as an electrode.

BACKGROUND ART

Growing concern about the global environment has led to advances in the conservation of resources and energy. Considerable progress has been made in the development of energy sources that utilize renewable "green" energy, and systems thereof, as energy resources. Fuel cell systems in which hydrogen serves as the energy source have a particularly wide range of applications, such as in alternative automobile engine technology, distributed power sources, and cogeneration technology. Also, the popularization of cellular telephones and other such personal information devices has advanced the development of large-capacity cells to power these devices. One promising technology in this field is fuel cells that make use of hydrogen, methanol, or other such fuel.

FIG. 9 shows the basic structure of a fuel cell. A fuel cell is made up of a) a fuel electrode for producing electrons and protons by reacting a fuel such as hydrogen, b) a solid electrolyte for transmitting the produced protons, and c) an oxygen electrode for reacting electrons supplied through an external circuit with oxygen and protons.

The reactions in the electrodes are as follows. First, with the fuel electrode, a fluid fuel that is a liquid or gas reacts with a catalyst on the electrode, with this reaction comprising $H_2 \rightarrow 2H^+\uparrow + 2e^-\uparrow$, for example. Charge-separated electrons are transferred from the electrode to an external circuit, and protons are transferred to a proton-conductive electrolyte. The electrolyte serves to transmit just protons, and one whose efficiency is decreased only minimally by the diffusion of fuel, etc., is used.

With the oxygen electrode located across from the fuel electrode, electrons and protons produced by the fuel electrode arrive and react with the oxygen in the air or with oxygen gas in the presence of a catalyst, and water is produced in a reaction comprising $O_2 + 4H^+\uparrow + 4e^-\uparrow \rightarrow 2H_2O$.

The result of above reactions is that electrical power can be obtained from the energy of hydrogen, methanol, and other such renewable energy sources, and since the reaction product is water, there are no environmental problems.

Carbon materials are widely used as the above-mentioned electrode materials. For instance, carbon black, activated carbon, graphite, conductive carbon, and other such carbon materials are formed into porous body and used as electrodes.

Methods for forming porous carbon have been studied in an effort to enhance the performance of these electrodes. For instance, one of the methods that have been proposed involves increasing the specific surface area and carbonizing an organic aerogel of a phenol polymer which is a precursor of carbon having numerous microscopic pores and a low density, in order to make the electrode reaction more efficient (such as in WO94/22943).

Another method that has been proposed involves carbonizing an organic gel of a polyimide polymer which is a precursor of carbon having numerous microscopic pores and a low density (such as in Japanese Unexamined Patent Publication 2000-154273).

DISCLOSURE OF THE INVENTION

Carbonizing an organic gel is one way to manufacture porous carbon. In specific terms, this method comprises (a) a step in which a wet gel of a carbon precursor polymer is produced by sol-gel method, (b) a step in which the resulting wet gel of a carbon precursor polymer is dried, and (c) a step in which the resulting porous carbon precursor polymer is calcined and carbonized. This manufacturing method produces a porous material having a low density and a large specific surface area.

In such fields of application as electrodes, however, there is a nearly constant need for higher performance of electronic devices, so there is also a need for even better performance of material such as these porous carbon materials. To achieve this increase in performance, a porous carbon material with a lower density and a larger specific surface area must be manufactured.

The following problems in particular are countered with methods for carbonizing organic gels.

(1) In the step of calcining and carbonizing the carbon precursor polymer, the porous precursor shrinks as carbonization proceeds, so the density of the resulting porous carbon material is higher than that of the precursor and the specific surface area tends to be lower.

(2) Because an organic gel having a reticulated skeleton is calcined, the density and specific surface area of the porous carbon material obtained by carbonization of this organic gel depend on the structure of the organic gel. It is difficult to control these values after the organic gel has already been obtained.

Therefore, a main object of the present invention is to provide a porous material with which efficient electrode reactions, catalyst reactions, and so forth can be achieved. It is another object of the present invention to provide a manufacturing process of high production efficiency for obtaining a porous material composed of a carbon material that will yield favorable density and specific surface area in the manufacture of a porous material. It is yet another object of the present invention to provide applications for a good carbon-based porous material made efficiently by the manufacturing method of the present invention.

Specifically, the present invention relates to the following porous material and a method for manufacturing this material, and to an electrochemical element in which this porous material is used.

1. A porous material having a reticulated skeleton, wherein:

(1) said reticulated skeleton comprises an interior and a surface part;

(2) the surface part includes a carbon material; and (3) the interior is made up of a) an inorganic oxide, b) empty space, or c) an inorganic oxide and empty space.

2. The porous material according to 1 above, wherein the interior is made up substantially entirely of an inorganic oxide.

3. The porous material according to 1 above, wherein the interior is made up substantially entirely of empty space.

4. The porous material according to 1 above, wherein a catalyst is supported on the reticulated skeleton.

5. A method for manufacturing the porous material according to 1 above, from a gel of an inorganic oxide having a reticulated skeleton, wherein said method comprises at least (1) a step A of obtaining a carbon-containing material by imparting a carbon material to said gel or (2) a step B of obtaining a carbon-containing material by imparting a carbon precursor to said gel and subjecting the resulting carbon precursor-containing gel to a carbonization treatment.

6. The manufacturing method according to 5 above, further comprising a step of removing all or part of the inorganic oxide from the carbon-containing material or the carbon precursor-containing gel.

7. The manufacturing method according to 5 above, wherein step B is accomplished by using a wet gel as the gel, imparting carbon precursor to said wet gel, drying the resulting carbon precursor-containing gel to obtain carbon precursor-containing dry gel, and carbonizing said dry gel to obtain a porous material as the carbon-containing material.

8. The manufacturing method according to 5 above, wherein step A is accomplished by using a dry gel as the gel and imparting a carbon material to said dry gel to obtain a porous material as the carbon-containing material.

9. The manufacturing method according to 6 above, wherein step B is accomplished by using a wet gel as the gel, imparting carbon precursor to said wet gel, removing all or part of the inorganic oxide from the resulting carbon precursor-containing gel, and then carbonizing the resulting material to obtain a porous material as the carbon-containing material.

10. The manufacturing method according to 5 above, wherein the carbon precursor comprises an organic polymer.

11. The manufacturing method according to 6 above, wherein the carbon precursor comprises an organic polymer.

12. The manufacturing method according to 10 above, wherein the organic polymer has one or more carbon-carbon unsaturated bonds.

13. The manufacturing method according to 10 above, wherein the organic polymer has one or more aromatic rings.

14. The manufacturing method according to 10 above, wherein the organic polymer is at least one member selected from the group consisting of phenol resins, polyimides, and polyacrylonitriles.

15. The manufacturing method according to 5 above, further comprising a step of supporting a catalyst.

16. The manufacturing method according to 6 above, further comprising a step of supporting a catalyst.

17. An electrochemical element in which a fuel electrode that produces protons from a fuel and an oxygen electrode that reacts protons with oxygen are disposed across from each other with a proton-conductive solid electrolyte therebetween,
wherein at least one of said fuel electrode and said oxygen electrode is the porous material according to 1 above.

18. The electrochemical element according to 17 above, wherein said fuel is hydrogen or methanol.

Figure 1:
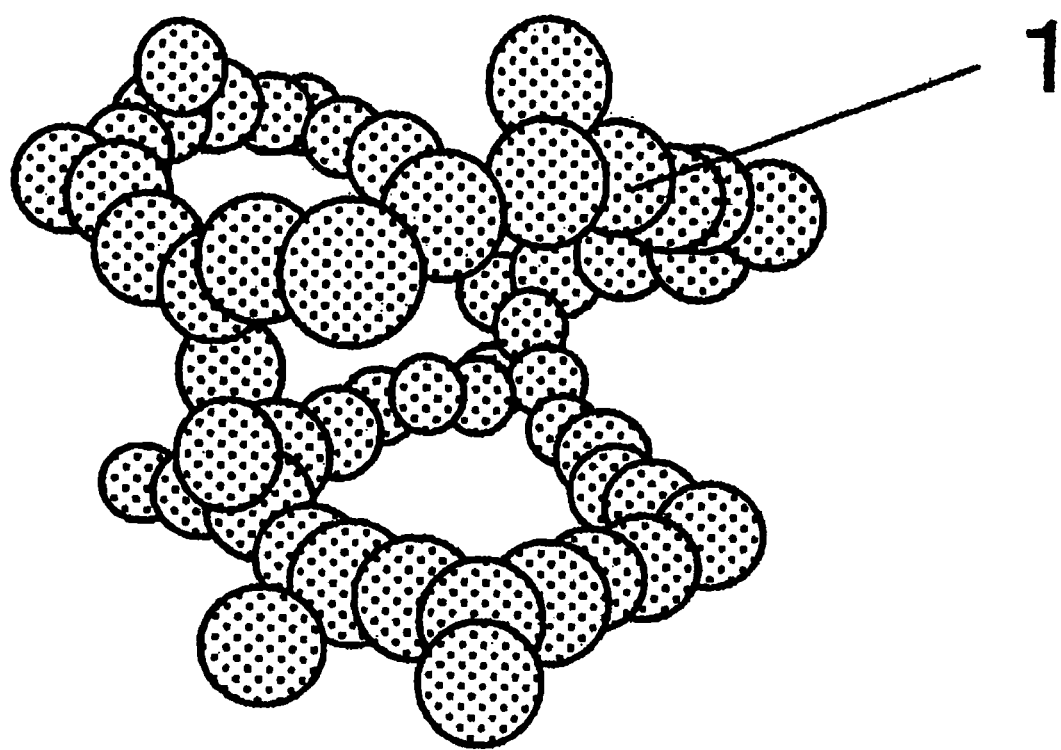
FIG. 1 is a schematic illustrating the reticulated skeleton in the porous material of the present invention.

KEY 1 reticulated skeleton
2 carbon composite porous material
3 dry gel of inorganic oxide
4 carbon material
5 porous carbon material
6 carbon material
7 hollow portion
8 reticulated skeleton
9 catalyst

BEST MODE FOR CARRYING OUT THE INVENTION

Embodiments of the present invention will now be described. First, the structure of the porous material of the present invention will be described through reference to the drawings.

1. Porous Material

The porous material (porous body) of the present invention has a reticulated skeleton, wherein (1) the reticulated skeleton comprises an interior and a surface component (or a surface part), (2) the surface component includes a carbon material, and (3) the interior is made up of a) an inorganic oxide, b) empty space, or c) an inorganic oxide and empty space.

The reticulated skeleton of the porous material of the present invention can be any skeleton having a three-dimensionally reticulated structure. This skeleton comprises an interior and a surface component.

The surface component includes a carbon material (and is preferably composed substantially of carbon). There are no particular restrictions on the carbon material as long as it is carbon or a material whose main component is carbon, but examples include carbon black (such as acetylene black and ketjen black), activated carbon, artificial graphite, natural graphite, carbon fiber, pyrolytic carbon, vitreous carbon, impermeable carbon, special carbon, and coke. Nor are there any restrictions on the crystal structure, which may comprise a diamond structure, graphite structure, etc. Carbon nanotubes, carbon nanohorns, carbon nanoribbons, carbon nanocoils, carbon nanocapsules, and the like can also be used. These materials can be used singly or in combinations of two or more types. Also, the carbon material may be either crystalline or amorphous. With the present invention, a suitable combination can be selected from these as dictated by the intended application of the porous material, its method of use, and other factors.

It is preferable to use a carbon material produced by carbonizing a raw material (starting material) of the carbon material, and/or a carbon material obtained by carbonizing an organic polymer as a carbon precursor. Advantages to these are that they are readily and favorably formed on the skeleton surface of a gel, and the structure, characteristics, and so forth of the carbon can be controlled as desired by varying the production conditions, carbonization treatment conditions, and the like.

The thickness of the surface component is not limited, and can be appropriately set according to the intended application of the porous material, its method of use, and other factors. Also, the above-mentioned thickness can be controlled by varying the conditions in the manufacturing method discussed below.

In the case of the above-mentioned a) and c), the ratio of inorganic oxide and carbon material can be appropriately determined according to the type of inorganic oxide, the intended application of the porous material, and other factors.

The interior of the porous material is made up of a) an inorganic oxide, b) empty space, or c) an inorganic oxide and empty space. That is, the porous material of the present invention is such that the content (proportion) of inorganic oxide in the porous material interior may range from 0 vol % to 100 vol %. Therefore, the present invention encompasses aspects including (i) where the porous material interior is formed substantially entirely from an inorganic oxide, (ii) where the porous material interior is substantially entirely empty space (hollow), and (iii) where part of the porous material interior is an inorganic oxide and the rest is empty space.

There are no particular restrictions on the type of inorganic oxide, which may be appropriately selected according to the intended application of the porous material, its method of use, and other factors, but examples include silicon oxide, aluminum oxide, titanium oxide, vanadium oxide, iron oxide, zirconium oxide, and so forth, as well as mixtures of these (mixed oxides), compound oxides, and so forth. These can be used singly or in combinations of two or more types.

The bulk density, BET specific surface area, and average pore diameter of the porous material of the present invention can be appropriately set as dictated by the type of inorganic oxide, the intended application of the porous material, its method of use, and other factors. Bulk density can be set as appropriate usually from about 10 to about 500 kg/m$^3$, and in particular from about 50 to about 400 kg/m$^3$. The specific surface area can be set as appropriate usually from about 50 to about 1500 m$^2$/g, and in particular is set as appropriate from about 100 to about 1000 m$^2$/g. The specific surface area is measured by the Brunauer-Emmett-Teller (hereinafter abbreviated as BET) method, which is a nitrogen adsorption method. The average pore diameter of the porous material of the present invention may ranges usually from 1 to 1000 nm, and in particular is set as appropriate from 5 to 50 nm.

There are no restrictions on the shape or size of the porous material of the present invention, which may be appropriately determined according to the intended application of the porous material, its usage purpose, and other factors.

Preferred embodiments of the porous material of the present invention will now be described through reference to the drawings.

(1) Embodiment 1

Of the porous materials of the present invention, Embodiment 1 is a porous material in which the interior is made up of an inorganic oxide. Specifically, this is a porous material having a reticulated skeleton, wherein (1) the reticulated skeleton comprises an interior and a surface component, (2) the surface component includes a carbon material, and (3) the interior is made up substantially entirely of an inorganic oxide. In other words, this is a porous material having a reticulated skeleton comprising an inorganic oxide covered with a carbon material (hereinafter also referred to as a "carbon composite porous material").

Figure 2:
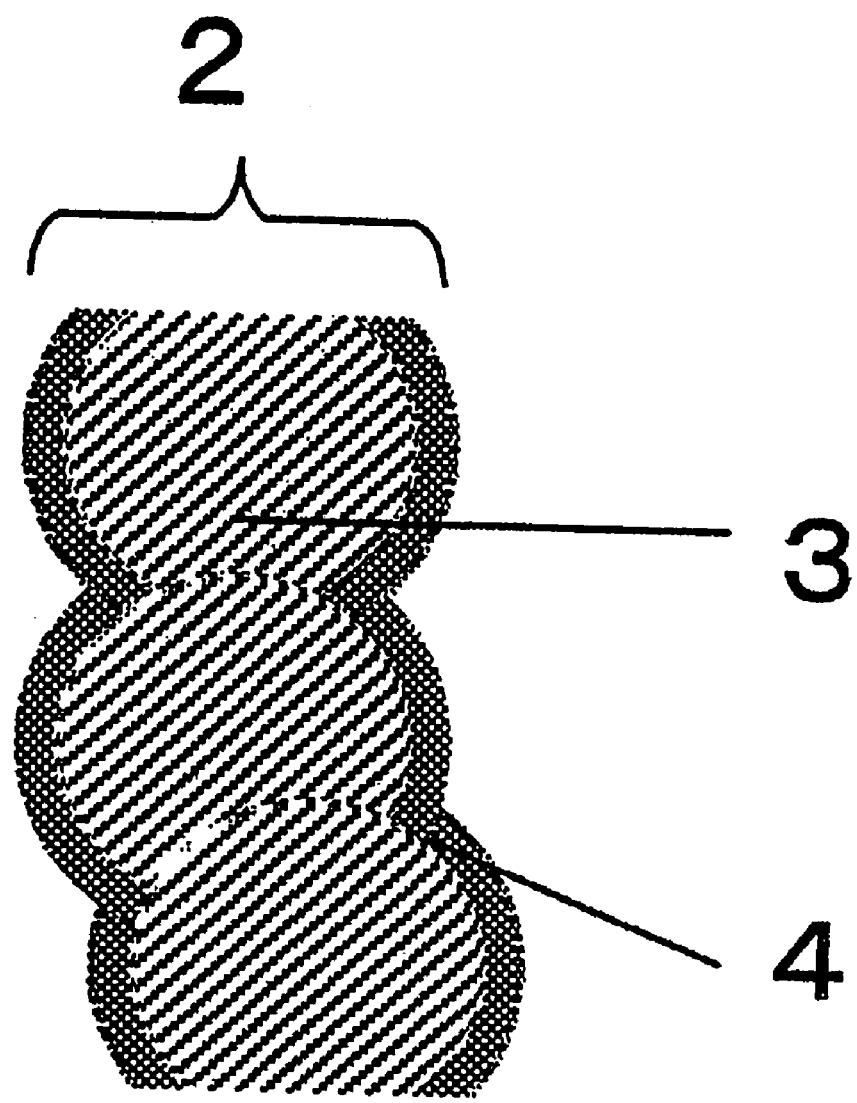
FIG. 2 is a cross section illustrating the reticulated skeleton in the carbon composite porous material of the present invention.

FIG. 1 is a schematic view of the overall carbon composite porous material. FIG. 2 is a cross section of the reticulated skeleton.

The reticulated skeleton 1 has a structure in which a skeleton as shown in FIG. 1 forms a three-dimensionally reticulated network. Such a structure can be prepared, for example, by a process in which a dry gel is obtained via a wet gel. When this process is employed, the above-mentioned skeleton forms a reticulated structure through the agglomeration of microparticles, and can therefore be represented as in FIG. 1. When the above-mentioned skeleton is actually viewed by electron microscope or the like, it can be seen to be a porous structure consisting of aggregates of microparticles, with voids in between these microparticles. With a structure obtained by the above process, the pores are generally constituted by voids formed by skeletons made from microparticles having a diameter of 100 nm or less. These pores are microscopic in size, about 1 μm or less. This makes it possible to achieve a porosity of at least 50%, and as a result a porous material having a large specific surface area can be provided. In particular, with a reticulated skeleton formed via a gel as in the present invention, these microparticles are very small, between 1 and 50 nm in size, and the resulting pores are also microscopic in size, being no larger than 100 nm. This results in a porosity of at least 80%, and a porous material having a large specific surface area of at least 100 m$^2$/g can be obtained.

As shown in FIG. 2, a reticulated skeleton 1 has an interior 3 composed of an inorganic oxide. This inorganic oxide fills the interior (core), and a carbon material 4 is present on the surface component thereof. The carbon composite porous material 2 of the present invention has such a large specific surface area because a dry gel 3 of an inorganic oxide is covered with the carbon material 4. As a result, the above-mentioned porous material can be utilized as an electrode material, catalyst material, or the like.

The inorganic oxide that makes up the interior of the reticulated skeleton 1 has better heat resistance than an organic material. Accordingly, the above-mentioned skeleton serves as a support for the carbon material, for example, in the process of carbonizing the carbon precursor, which minimizes shrinkage of the porous material during carbon formation. The result of this is that the carbon composite porous material has lower density and a larger specific surface area.

(2) Embodiment 2

Figure 3:
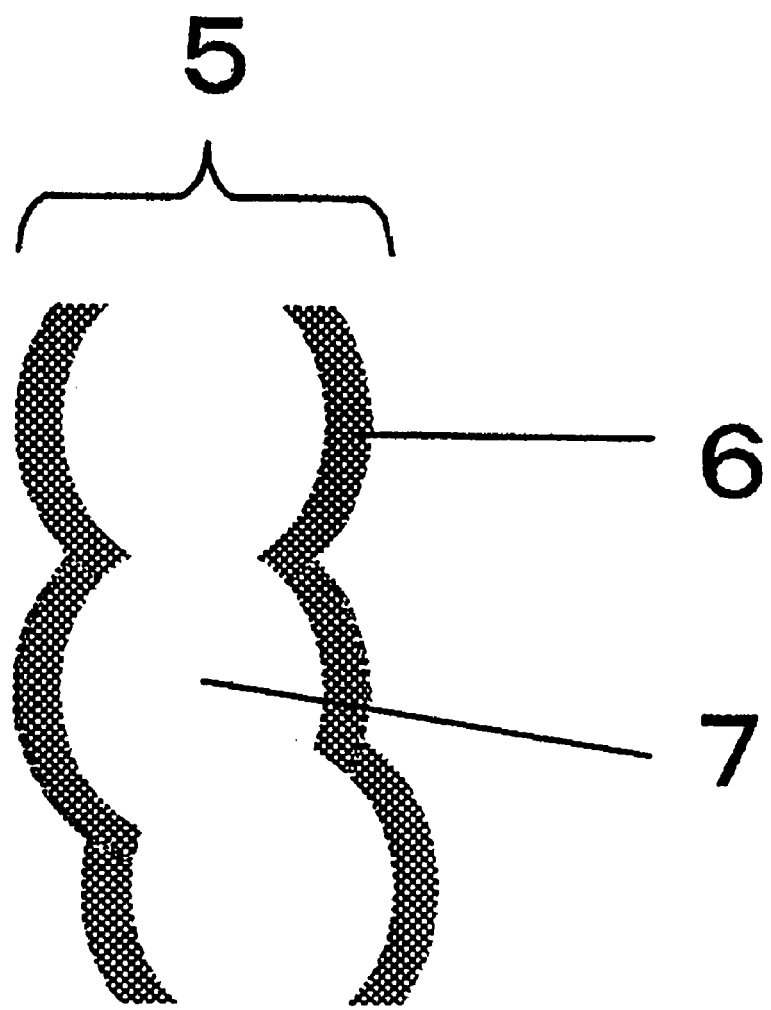
FIG. 3 is a cross section illustrating the reticulated skeleton in the porous carbon material of the present invention.

The second embodiment of the porous material according to the present invention is a carbon porous material having a reticulated skeleton as shown in FIG. 1. As shown in FIG. 3, the surface component of this skeleton is composed of a carbon material 6, while the interior is made up substantially entirely of a hollow 7 (empty space).

In addition to the large specific surface area achieved with the above structure, produced by the reticulated skeleton that is a dry gel structure, the interior of the skeleton is the hollow component 7 in this embodiment. Because of its hollow component, this porous material has a correspondingly larger specific surface area than that of the above-mentioned carbon composite porous material 2. This makes it possible to use the porous material as electrode materials, catalyst materials, and so forth with higher activity.

(3) Embodiment 3

Figure 4:
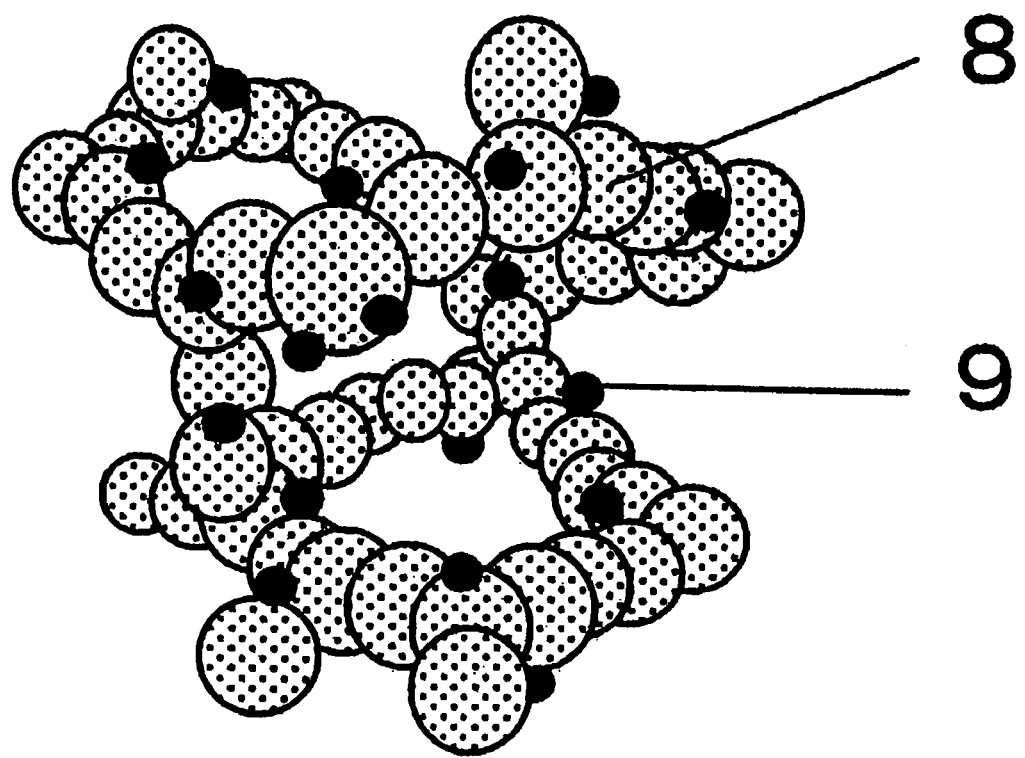
FIG. 4 is a schematic illustrating another example of the porous material of the present invention.

As shown in FIG. 4, in the third embodiment of the porous material pertaining to the present invention, there is a carbon composite porous material or carbon porous material having a reticulated skeleton 8, and a catalyst 9 (catalyst activity component) is supported on the surface component of this material. In this embodiment, the porous material with a large specific surface area discussed in Embodiments 1 and 2 serves as a support, so more catalyst can be supported and there are more reaction activity sites, among other advantages. This makes it possible to provide electrode materials, catalyst materials, and so forth with higher activity.

The catalyst 8 here may be present in any state, as long as it is in contact with the carbon material. For instance, in the case of the carbon composite porous material of Embodiment 1, the catalyst may be present either on the carbon material surface or within the carbon material. In the case of Embodiment 2, the catalyst may be present either on the carbon material surface or on the inner surface of the carbon material. It terms of increasing the probability of contact with the reactants, it is preferable for the catalyst to be present on the surface of the carbon material.

2. Method for Manufacturing the Porous Material

The method for manufacturing a porous material of the present invention encompasses the following first to third inventions.

The first invention is a method for manufacturing a porous material having a reticulated skeleton, wherein this method comprises at least (1) a step A of obtaining a carbon-containing material by imparting a carbon material to a gel of an inorganic oxide having a reticulated skeleton or (2) a step B of obtaining a carbon-containing material by imparting a carbon precursor to said gel and subjecting the resulting carbon precursor-containing gel to a carbonization treatment.

The second invention is the method of the first invention, further comprising a step of removing all or part of the inorganic oxide from the carbon-containing material or the carbon precursor-containing gel.

The third invention is the method of the first or second invention, further comprising a step of supporting a catalyst.

First Invention

The first invention is a method for manufacturing a porous material, comprising at least (1) a step A of obtaining a carbon-containing material by imparting a carbon material to a gel of an inorganic oxide having a reticulated skeleton or (2) a step B of obtaining a carbon-containing material by imparting a carbon precursor to said gel and subjecting the resulting carbon precursor-containing gel to a carbonization treatment.

Of the porous materials of the present invention, a porous material in which the interior is filled substantially entirely with an inorganic oxide can be produced favorably with the first invention. Either step A or step B can be selected with the first invention.

Step A

This is a step in which a carbon-containing material is obtained by imparting carbon to the above-mentioned gel.

There are no particular restrictions on the gel of an inorganic oxide having a reticulated skeleton (the starting raw material), as long as it does have a reticulated skeleton. This gel can be one of two types, depending on whether it contains a liquid (solvent): a wet gel (a gel containing a solvent in the voids of the reticulated skeleton) or a dry gel (a gel in which substantially no solvent is present in the voids of the reticulated skeleton). Either of these types can be employed in the present invention.

The type of inorganic oxide can be appropriately selected from among various metal oxides according to the intended application of the porous material, its method of use, and other factors. One that can be formed by sol-gel method is particularly favorable for the purpose of forming a reticulated skeleton. Examples include silicon oxide (silica), aluminum oxide (alumina), titanium oxide, vanadium oxide, tantalum oxide, iron oxide, magnesium oxide, zirconium oxide, zinc oxide, tin oxide, cobalt oxide, and so forth, as well as mixed oxides, double oxides, and the like of the above. Of these, silica and alumina, either singly or together, are preferable because they facilitate the formation of a wet gel by sol-gel method.

The gel can be prepared by any known method. The use of a gel prepared by sol-gel method is particularly favorable in that a reticulated skeleton can be formed more reliably, as mentioned above. The following description will use manufacture by sol-gel method as a typical example.

There are no restrictions on the raw material as long as it will form a wet gel by sol-gel method. Any raw material used in known sol-gel processes can be used, but examples include sodium silicate, aluminum hydroxide, and other such inorganic materials, and tetramethoxysilane, tetraethoxysilane, aluminum isopropoxide, aluminum sec-butoxide, and other such organometal alkoxides (organic materials). These can be selected according to the desired type of inorganic oxide.

The sol-gel method may be carried out under known conditions. In general, the above-mentioned raw material is dissolved in a solvent to prepare a solution, and gelling is effected by conducting a reaction at room temperature or under heating. For instance, when a wet gel of silica ($SiO_2$) is to be made, the following procedure is carried out.

Examples of silica raw materials include tetramethoxysilane, tetraethoxysilane, trimethoxymethylsilane, dimethoxydimethylsilane, and other such alkoxysilane compounds, oligomers of these, sodium silicate, potassium silicate, and other such water glass compounds, and colloidal silica. These can be used singly or in mixtures.

There are no restrictions on the solvent as long as it will dissolve the raw material, but not the silica that is produced. Examples include water, methanol, ethanol, propanol, acetone, toluene, and hexane. These can be used singly or in mixtures.

If needed, various additives such as a catalyst, a viscosity regulator, or the like can also be added. Catalysts that can be used include water, acids such as hydrochloric acid, sulfuric acid, and acetic acid, and bases such as ammonia, pyridine, sodium hydroxide, and potassium hydroxide. Viscosity regulators that can be used include ethylene glycol, glycerol, polyvinyl alcohol, and silicone oil, but there are no restrictions as long as the wet gel can be put into the required usage form.

The above-mentioned raw material is dissolved in a solvent to prepare a solution. The concentration of the solution in this case will vary with the type of raw material or solvent being used, the desired condition of the gel, and so forth, but generally the concentration of the solid component that will form the skeleton may be about several weight percent to several dozen weight percent. The above-mentioned solution may be put into the required usage form by adding the above-mentioned additives as needed, stirring, and then molding, coating, etc. Once a specific amount of time passes in this state, the solution gels, yielding the required wet gel. More specifically, the raw material reacts in the solvent while microparticles of silica are formed, and these microparticles aggregate to form a reticulated skeleton and produce a wet gel.

In this case, there are no restrictions on the temperature of the solution, and the reaction can be carried out either at ordinary temperature or under heating. If heating is performed, the temperature thereof can be appropriately set to be under the boiling point of the solvent being used. Depending on the combination of raw material and so forth, cooling may also be performed during gelling.

The wet gel thus produced can also be subjected to a surface treatment as needed, for the purpose of enhancing solvent affinity, for example, in the subsequent step of forming a carbon precursor, for example. In this case, a surface treatment agent can be chemically reacted with the surface of the solid component of the wet gel in the solvent. Examples of surface treatment agents include trimethylchlorosilane, dimethyldichlorosilane, methyltrichlorosilane, ethyltrichlorosilane, phenyltrichlorosilane, and other such halogen-based silane treatment agents; trimethylmethoxysilane, trimethylethoxysilane, dimethyldimethoxysilane, methyltriethoxysilane, phenyltriethoxysilane, and other such alkoxy-based silane treatment agents; hexamethyldisiloxane, dimethylsiloxane oligomer, and other such silicone-based silane treatment agents; hexamethyldisilazane and other such amine-based silane treatment agents; and propyl alcohol, butyl alcohol, hexyl alcohol, octanol, decanol, and other such alcohol-based treatment agents. These can be used singly or in combinations of two or more types according to the intended application of the porous material and other factors.

As discussed above, carbon or a material whose main component is carbon can be used as the carbon material imparted to the gel. Examples include carbon black, (such as acetylene black and ketjen black), activated carbon, artificial graphite, natural graphite, carbon fiber, pyrolytic carbon, vitreous carbon, impermeable carbon, special carbon, and coke. Nor are there any restrictions on the crystal structure, which may comprise a diamond structure, graphite structure, etc. Nano-carbon materials such as carbon nanotubes, carbon nanohorns, carbon nanoribbons, carbon nanocoils, carbon nanocapsules, and the like can also be used. These materials can be used singly or in combinations of two or more types. These materials can be appropriately selected according to the intended application of the porous material and so on. For instance, a material with excellent electroconductivity is preferred when the porous material of the present invention is to be used as an electrode.

There are no particular restrictions on the method for imparting the carbon material. Either a vapor phase process, liquid phase process, or solid phase process can be employed. Examples include a) a method in which a carbon material is deposited on the surface of the skeleton of the gel (preferably a dry gel) by vapor phase process and b) a method in which a dispersion of a carbon material (such as carbon-containing ultrafine particles with an average particle size of 10 nm or less) is imparted to a gel (preferably a wet gel).

The step of imparting a carbon material by vapor phase process will now be described as the above method a).

This method involves applying energy to a raw material capable of producing a carbon material, and depositing the carbon material thus produced on the surface of the skeleton of a gel. This method allows a carbon material to be formed on a gel. Accordingly, there is no need for a carbonization treatment, so this method is very efficient.

Examples of the above-mentioned raw material include methane, ethane, propane, butane, and other such saturated hydrocarbon compounds; ethylene, acetylene, propylene, and other such unsaturated hydrocarbon compounds; benzene, xylene, and other such aromatic hydrocarbon compounds; methanol, ethanol, and other such alcohols; acrylonitrile and other such nitrogen-containing hydrocarbon; and a mixed gas of carbon monoxide and hydrogen, a mixed gas of carbon dioxide and hydrogen, and other such carbon-containing gases. These can be used singly or in combinations of two or more types.

The energy used to change these raw materials into carbon includes heat, a plasma, ions, light, a catalyst, or the like. To promote carbonization within a dry gel, a method involving heating is preferable because it is easier to control.

The vapor phase process can be conducted under ordinary conditions. For instance, the gel is placed in a reaction vessel, the above-mentioned raw material is vaporized in the reaction atmosphere, and this vapor is heated to deposit carbon on the surface of the skeleton of the gel. The conditions in this case can be appropriately adjusted according to the intended application of the porous material, the desired characteristics, and so forth.

The above-mentioned method b) involves dispersing carbon in a solvent contained in a gel, preferably with using a wet gel, and then performing a drying treatment to obtain a carbon-containing material. In this case the dispersed carbon material preferably consists of ultrafine particles having an average size of at least 1 nm and not more than 10 nm.

There are no particular restrictions on the amount of carbon material used (coverage amount) in the covering of the gel with the carbon material, which can be appropriately set according to the intended application of the porous material, its method of use, the type of the carbon material, and other factors.

The carbon-containing material obtained in step A may be used directly as the porous material of the present invention. Alternatively, a solvent removal step (drying step) may be performed as needed for the purpose of eliminating any residual solvent in the gel, for example. It is particularly favorable to include a solvent removal step when a wet gel is used as the gel. This step may be the same as the drying step discussed below.

Step B

This is a step in which a carbon-containing material is obtained by imparting a carbon precursor to the above-mentioned gel, and carbonizing the carbon precursor-containing gel thus obtained.

The above-mentioned gel can be the one discussed in step A. Therefore, the gel can be either a wet gel or a dry gel.

There are no particular restrictions on the carbon precursor as long as it will eventually become carbon upon carbonization. Therefore, any material that contains carbon can be used, an organic material is generally used.

Of these materials, the use of organic polymers is preferred in the present invention. Examples include polyacrylonitrile, polyfurfuryl alcohol, polyimide, polyamide, polyurethane, polyurea, polyphenol (phenol resin), polyaniline, polyparaphenylene, polyetherimide, polyamide-imide, acrylic copolymers, and other such polymers and copolymers.

Of these, an organic polymer having one or more carbon-carbon unsaturated bonds is preferable. Specifically, an organic polymer having either one or more carbon-carbon double bonds or one or more carbon-carbon triple bonds, or both, can be used to advantage. The use of such an organic polymer allows for easier and more reliable carbonization, and furthermore allows a carbon material having the required strength to be formed. Examples include a phenol resin, epoxy resin, polyimide, polystyrene, polysulfone, polyphenylene ether, melamine resin, and aromatic polyamide. These can be used singly or in combinations of two or more types. The concurrent use of another organic polymer is also possible. An organic polymer having one or more aromatic rings is particularly favorable in the present invention. For example, at least one selected from a phenol resin, polyimide resin, and so forth can be used favorably.

Even an organic polymer without an aromatic ring (such as polyacrylonitrile or an acrylic copolymer) can be used favorably if it produces unsaturated bonds by cyclization as carbonization proceeds. Put another way, an organic polymer that does not have a carbon-carbon unsaturated bond prior to carbonization, but that undergoes cyclization upon being carbonized and can thereby produce a carbon-carbon unsaturated bond can also be used favorably. Of these organic polymers, polyacrylonitrile is particularly favorable.

There are no particular restrictions on the method for preparing the carbon precursor-containing gel by imparting a carbon precursor to a gel, as long as the method allows a carbon precursor to be formed on the reticulated skeleton of an inorganic oxide that serves as a support. Examples of methods that can be favorably employed include (a) impregnating a wet gel of an inorganic oxide with a carbon precursor, (b) impregnating a wet gel with a monomer or oligomer capable of forming an organic polymer, then polymerizing this product to obtain an organic polymer that is a carbon precursor, and (c) imparting by vapor phase process a monomer capable of forming an organic polymer in a dry gel of an inorganic oxide, then polymerizing this product to obtain an organic polymer that is a carbon precursor.

In specific terms, the above-mentioned method (a) involves immersing a wet gel in a dispersion (emulsion, etc.) obtained by dispersing a carbon precursor in a solvent or a solution obtained by dissolving a carbon precursor in a solvent. As a result, the carbon precursor adheres to and covers the surface of the reticulated skeleton. When an organic polymer is used as the carbon precursor and a solution or dispersion thereof is brought into contact with a wet gel, the wet gel holds the solution or dispersion in its interior, and after drying, the organic polymer remains in the reticulated skeleton. In this case, the dissolved polymer may be physically adsorbed to the reticulated skeleton. If the wet gel containing the solution in which the organic polymer is dissolved is immersed in a poor solvent of this organic polymer, the organic polymer will precipitate on the reticulated skeleton, forming a surface component.

The solvent used for the above-mentioned solution or dispersion can be appropriately selected from among known solvents according to the type of organic polymer and so forth. Examples include water; alcohls such as methanol, ethanol, propanol, butanol, or the like; glycols such as ethylene glycol, propylene glycol, or the like. These can be used singly or in combinations of two or more types.

There are no particular restrictions on the concentration of the carbon precursor in the solution or dispersion, which can be appropriately determined as dictated by the desired amount of carbon precursor to be imparted, the type of carbon precursor, and other factors.

In specific terms, the above-mentioned method (b) involves immersing a wet gel in a solution obtained by dissolving in a solvent an organic compound (including oligomers) capable of forming an organic polymer by polymerization, or in a dispersion by dispersing this compound in a solvent, performing polymerization in the interior of the gel, and producing an organic polymer that is a carbon precursor. According to this method, since an organic polymer grows in the interior of the reticulated skeleton, it is possible to obtain a carbon precursor-containing wet gel that is resistant to physical elution.

A monomer corresponding to the targeted organic polymer may be used as the above-mentioned organic compound. For example, acrylonitrile can be used when polyacrylonitrile is to be obtained, furfuryl alcohol when polyfurfuryl alcohol is to be obtained, and aniline when polyaniline is to be obtained. When a polyimide is to be produced, a tetracarboxylic anhydride compound and a diamine compound can be used as standard compounds when the polyimide is produced by polycondensation that forms imide rings. When a polyamide is to be obtained, a dicarboxylic acid compound or dicarboxylic acid chloride and a diamine compound can be used as standard compounds when the polyamide is produced by polycondensation that forms amide bonds. A polyol or other diol compound and a diisocyanate compound can be used when a polyurethane is to be produced, a diisocyanate compound can be used when a polyurea is to be obtained, and a phenol compound and an aldehyde compound or the like can be used when a polyphenol is to be obtained.

The organic polymer of the present invention is preferably one having a carbon-carbon unsaturated bond, so an organic compound that produces such an organic polymer can be used favorably. For instance, when the organic polymer is a phenol resin, examples of phenol compounds include phenol, cresol, resorcinol (1,3-benzenediol), catechol, phloroglycinol, salicylic acid, and hydroxybenzoic acid. In this case, an aldehyde compound such as formaldehyde, acetaldehyde, furfural as well as a para-formaldehyde or hexamethylenetetramine that produces formaldehyde upon heating can be used as a condensation agent. A base catalyst and/or acid catalyst can be used as a condensation catalyst. A basic catalyst mainly promotes an addition reaction of methylol groups and so forth, and an acid catalyst mainly promotes a polyaddition-condensation reaction with methylene bonds and the like. The base catalyst can be any catalyst commonly used in the manufacture of phenol resins, such as sodium hydroxide, potassium hydroxide, and other such hydroxides of alkali metals, sodium carbonate, potassium carbonate, and other such carbonates of alkali metals, or amines, ammonia, and the like. The acid catalyst can be sulfuric acid, hydrochloric acid, phosphoric acid, oxalic acid, acetic acid, trifluoroacetic acid, or the like.

There are no particular restrictions on the solvent in which the organic compound is dissolved or dispersed, which may be appropriately selected from among known solvents according to the type of organic compound being used and other factors. Examples include water, methanol, ethanol, propanol, butanol, and other such alcohols, and ethylene glycol, propylene glycol, and other such glycols. These can be used singly or in combinations of two or more types.

There are no particular.restrictions on the concentration of the organic compound in the solution or dispersion, which can be appropriately determined according to the type of organic compound being used and other factors.

There are no particular restrictions on the polymerization method, and any known method can be employed, such as thermal polymerization, catalyst polymerization, or optical polymerization.

With the above method (c), a monomer capable of forming an organic polymer that is a carbon precursor is imparted by vapor phase process in a dry gel of an inorganic oxide, and the monomer is then polymerized. In specific terms, this method involves vaporizing a monomer of an organic polymer such as the above-mentioned polyacrylonitrile, polyfurfuryl alcohol, or polyaniline, packing this vapor into the gel, and then polymerizing. It is also possible to first pack a phenol compound such as polyphenol, and then vaporize and pack formaldehyde or another condensation agent, and perform polycondensation. With a polyimide, polyamide, or the like, another option is to evaporate a carboxylic acid compound and a diamine compound, pack the vapor into the gel, and perform polycondensation.

There are no particular restrictions on the vapor phase process, and any known method can be employed. For example, with using a standard method such as chemical vapor deposition (CVD) or physical vapor deposition (PVD), a method in which a polymer or monomer thereof is vaporized or evaporated by heating or the like can be employed.

The polymerization is carried out in the same manner as in (b) above.

In the subsequent carbonization treatment step, a carbonization treatment is performed by heat treating the resulting carbon precursor-containing gel.

In this case, when the gel is a wet gel, it is preferable for it to be dried to produce a dry gel prior to the carbonization treatment.

This drying can be accomplished by the ordinary drying methods of natural drying, heat drying, or reduced pressure drying, as well as by supercritical drying, freeze drying, or another such method. In general, gel strength decreases as the surface area of a dry gel increases, and as the solid component content in a wet gel is reduced in order to achieve a lower density. Also, with just ordinary drying, a gel often shrinks due to stress built up during solvent evaporation. Supercritical drying and freeze drying can be used to advantage as the drying means in order to obtain a desired dry gel from a wet gel. This effectively avoids gel shrinkage during drying, that is, an increase in density. Even with ordinary drying involving solvent evaporation, shrinkage of the gel during drying can be minimized by controlling the evaporation temperature or using a high-boiling solvent so that the evaporation will occur more slowly. With a wet gel, shrinkage of the gel during drying can be minimized by controlling the surface tension by subjecting the surface of the solid component of the gel to a water repellency (hydrophobic) treatment or the like.

According to supercritical drying or freeze drying method, the vapor-liquid interface can be eliminated and the drying can be carried out without imparting stress to the gel skeleton due to surface tension by changing the phase. state of the solvent from a liquid state. This prevents the gel from shrinking during drying and yields a porous dry gel having a lower density. The use of supercritical drying is particularly favorable in the present invention.

The solvent used in supercritical drying can be the solvent held by the wet gel. It is preferable to replace this solvent with one that is easier to handle in supercritical drying, if necessary. Examples of replacement solvents include carbon dioxide, water, and methanol, ethanol, isopropyl alcohol, and other alcohols that directly convert the solvent into a supercritical fluid. Alternatively, the solvent may be replaced with an organic solvent such as acetone, isoamyl acetate, or hexane that facilitates elution with these supercritical fluids.

The supercritical drying can be carried out in an autoclave or other pressure vessel. When the solvent is methanol, for instance, the procedure involves setting a supercritical pressure of at least 8.09 MPa and a supercritical temperature of at least 239.4° C., which are supercritical conditions for methanol, and gradually releasing the pressure at a constant temperature. When the solvent is carbon dioxide, the drying is carried out by setting a supercritical pressure of at least 7.38 MPa and a supercritical temperature of at least 31.1° C. in a gas state at a constant temperature by releasing the pressure from the supercritical state. When the solvent is water, the drying is carried out by setting a supercritical pressure of at least 22.04 MPa and a supercritical temperature of at least 374.2° C. How long the drying takes may be at least the amount of time it takes for the solvent in the wet gel to be replaced one or more times by the supercritical fluid.

The carbonization treatment is preferably carried out at 300° C. or higher because the carbonization of the carbon precursor begins to proceed at about 300° C. or higher. From the standpoint of making efficient use of work time, a temperature of at least 400° C. is preferable. The upper limit to the heating temperature can be appropriately set at a temperature below the melting point of the inorganic oxide of the reticulated skeleton. For example, when silica is used as the inorganic oxide, the dry gel thereof shrinks somewhat at about 600° C., but shrinks considerably at 1000° C. and above. Therefore, the carbonization treatment temperature may be selected so as to suppress this shrinkage. With the present invention, it is particularly favorable for the carbonization treatment to be carried out at less than 1000° C. (with 800° C. and below being even better).

There are no particular restrictions on the atmosphere in which the carbonization treatment is performed, which can be air, an oxidative atmosphere, a reductive atmosphere, an inert gas atmosphere, a vacuum, etc. When combustion and other factors are taken into account, and when the temperature is to be set high, the treatment may be performed in an atmosphere with a low oxygen concentration. "Atmosphere with a low oxygen concentration" as used in the present invention means that the oxygen concentration of the atmosphere is 0 to 10%. The carbonization treatment can be accomplished by retorting, heating in an atmosphere of an inert gas such as nitrogen or argon, or heating in a vacuum.

Second Invention

The second invention is the method in the first invention, further comprising a step of removing all or part of the inorganic oxide from the carbon-containing material or the carbon precursor-containing material.

According to the second invention, of the porous materials of the present invention, a porous material in which the interior is made up of an inorganic oxide and empty space, or a porous material in which the interior is made up of just empty space can be favorably obtained. Specifically, if part of the inorganic oxide is removed, the resulting porous material will have an interior made up of an inorganic oxide and empty space. If all of the inorganic oxide is removed, the resulting porous material will have an interior made up substantially of empty space.

The step of removing the inorganic oxide will now be described. With the second invention, all or part of the inorganic oxide is removed from the carbon-containing material or the carbon precursor-containing material. This removal step may be carried out at any stage of the first invention. Specifically, the present invention encompasses a method in which all or part of the inorganic oxide is removed from the carbon-containing material obtained in step A, a method in which all or part of the inorganic oxide is removed from the carbon precursor-containing material obtained in step B, after which the resulting material is carbonized, and a method in which all or part of the inorganic oxide is removed from the carbon-containing material obtained by carbonization in step B.

There are no restrictions on how the inorganic oxide is removed, and any known method can be employed, such as evaporation, sublimation, or elution. It is particularly favorable in the present invention for the removal to be effected by elution because it affords moderate conditions that have less effect on the gel skeleton.

The elution can be carried out by immersing the material in a solvent that will dissolve the inorganic oxide. An acid or base solution can be used favorably as the solution used here. Generally, a gel of an inorganic oxide formed by a standard sol-gel method has low crystallinity, it is often amorphous. Therefore, its solubility is high in strong acids or bases. Also, a gel with a reticulated skeleton in which microparticles are agglomerated has a strong property of falling apart (deflocculation).

The acid or base can be appropriately selected according to the type of inorganic oxide. For instance, hydrofluoric acid, an alkali hydroxide (sodium hydroxide, potassium hydroxide), an alkali carbonate (sodium carbonate, sodium hydrogencarbonate), or the like can be used favorably when the inorganic oxide is silica or the like. These can be used in the form of an aqueous solution, an alcohol solution, or the like. The concentration of the acid or base may be appropriately determined as dictated by the type of acid or base being used, the type of inorganic oxide, and so forth.

The second invention in which the inorganic oxide is removed yields a porous material whose specific surface area is greater than that of the carbon composite porous material obtained in the first invention. Observation by electron microscope or the like of the reticulated skeleton composed of this carbon material frequently reveals a hollow structure. Even if a distinct hollow structure is not seen in electron microscope observation, the resulting carbon porous material will still have a large specific surface area.

Third Invention

The third invention is the method in the first or second inventions, further comprising a step of supporting a catalyst (catalyst activity component).

The above-mentioned step may be carried out at any stage in the first and second inventions. For example, this may involve a method in which a catalyst is imparted during the formation of a wet gel of an inorganic oxide, a method in which a wet gel of an inorganic oxide is formed, after which a catalyst is imparted to the surface thereof, a method in which a carbon precursor is formed, after which a catalyst is imparted, or a method in which a carbon porous material is formed, after which a catalyst is imparted. In the course of supporting a catalyst in a form of the precursor, a catalyst conversion treatment (such as a heat treatment or reduction treatment) can be performed after the precursor is supported. The method can be appropriately selected according to the type of catalyst being used and other factors.

The catalyst can be appropriately selected according to the intended application of the porous material, its method of use, and other factors. When the porous material is to be used for the electrode of a fuel cell, for instance, a standard catalyst such as platinum, palladium, ruthenium, gold, copper, tin, zinc, or another such metal, platinum-palladium, platinum-ruthenium, platinum-iron, or another such alloy, or a nickel-based oxide or manganese-based oxide or another. oxide can be used. When the porous material is to be used in an application other than an electrode, such as in deodorization, a catalyst suited to that application may be supported.

There are no particular restrictions on the means for imparting the catalyst, which may be accomplished by any known method. Examples include 1) a method in which a colloid is used to support the catalyst, 2) a method in which a precursor such as a metal salt is supported, after which reduction is performed with hydrogen or another reductant, and 3) a method in which a catalyst is supported in the porous material by subjecting a precursor such as a metal salt to calcining or the like.

The amount of catalyst supported can be appropriately determined according to the condition of the porous material, the type of catalyst, the intended application, and other factors.

Preferred embodiments of the porous material manufacturing method of the present invention will now be described through reference to the drawings.

(4) Embodiment 4

Figure 5:
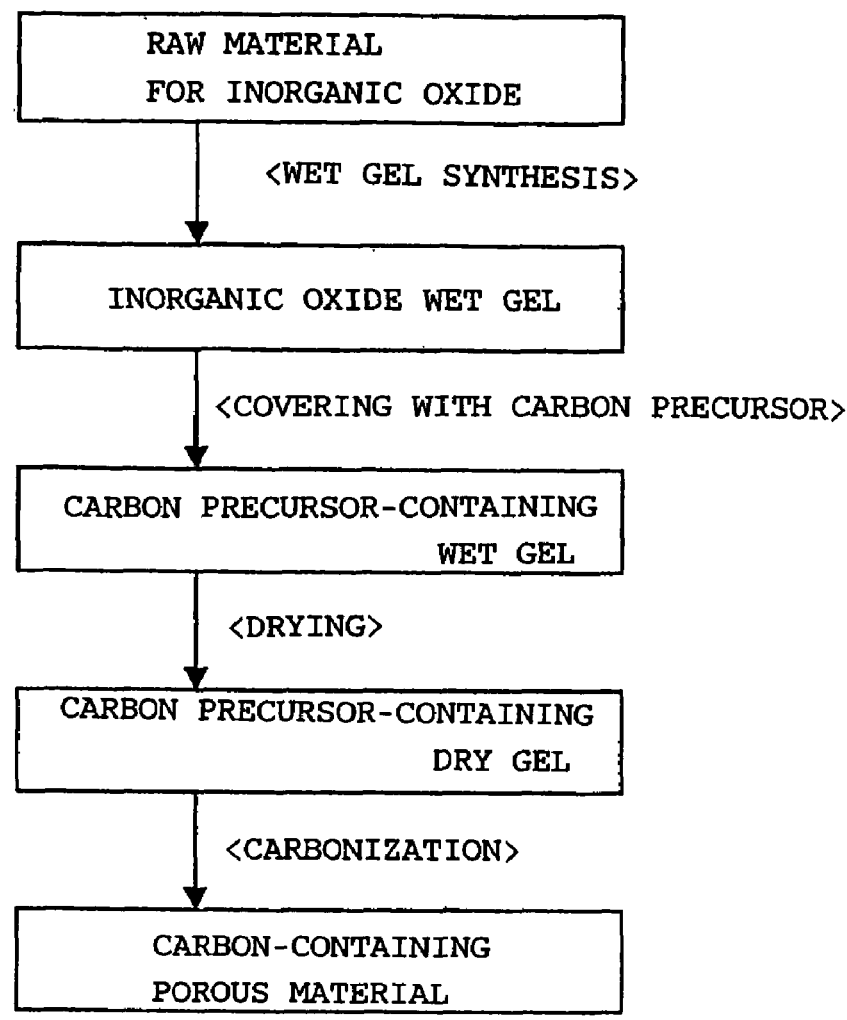
FIG. 5 is a flow chart illustrating an example of the method for manufacturing the carbon composite porous material obtained in the present invention.

The first method for manufacturing a carbon-containing porous material pertaining to the present invention basically comprises the steps as shown in FIG. 5.

The basic steps in this method are that a reticulated skeleton of an inorganic oxide is formed, after which a carbon precursor is formed in the wet gel of this skeleton, and this carbon precursor is carbonized into carbon. Specifically, this embodiment is a method comprising a step of obtaining a carbon precursor-containing wet gel in which a carbon precursor covers the surface of an inorganic oxide by imparting a carbon precursor to a wet gel of an inorganic oxide having a reticulated skeleton, a step of obtaining a dry gel by drying this wet gel, and a step of obtaining a carbon-containing porous material by carbonizing this dry gel. These are the basic steps, but other known treatments such as solvent replacement, catalyst formation, or surface treatment may be performed as needed.

With this manufacturing method, in the course of carbonizing the carbon precursor, the reticulated skeleton composed of an inorganic oxide serves as a support that maintains the structure by minimizing the shrinkage that accompanies carbonization. Specifically, shrinkage of the precursor porous material as it is carbonized can be kept low. This suppresses or prevents an increase in density during the transition from precursor to carbon, and has the effect of minimizing the decrease in specific surface area.

(5) Embodiment 5

Figure 6:
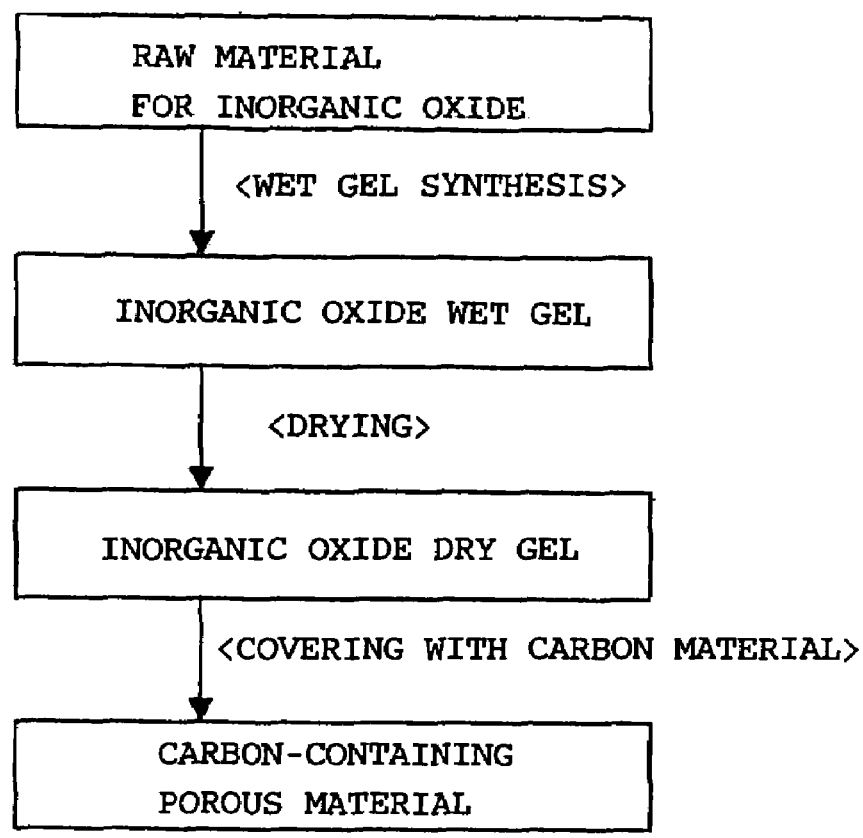
FIG. 6 is a flow chart illustrating another example of the method for manufacturing the carbon composite porous material obtained in the present invention.

The second method for manufacturing a carbon-containing porous material pertaining to the present invention comprises the steps as shown in FIG. 6.

The steps in this method are that a carbon material is imparted, primarily by vapor phase process, to a dry gel obtained by forming a reticulated skeleton of an inorganic oxide. Specifically, this embodiment is a method comprising a step of obtaining a dry gel by drying a wet gel of an inorganic oxide having a reticulated skeleton, and a step of obtaining a carbon-containing porous material in which the surface of the inorganic oxide is covered with a carbon material by imparting the carbon material to the dry gel. These are the basic steps, but other known treatments such as solvent replacement, catalyst formation, or surface treatment may be performed as needed in implementing this method.

(6) Embodiment 6

Figure 7:
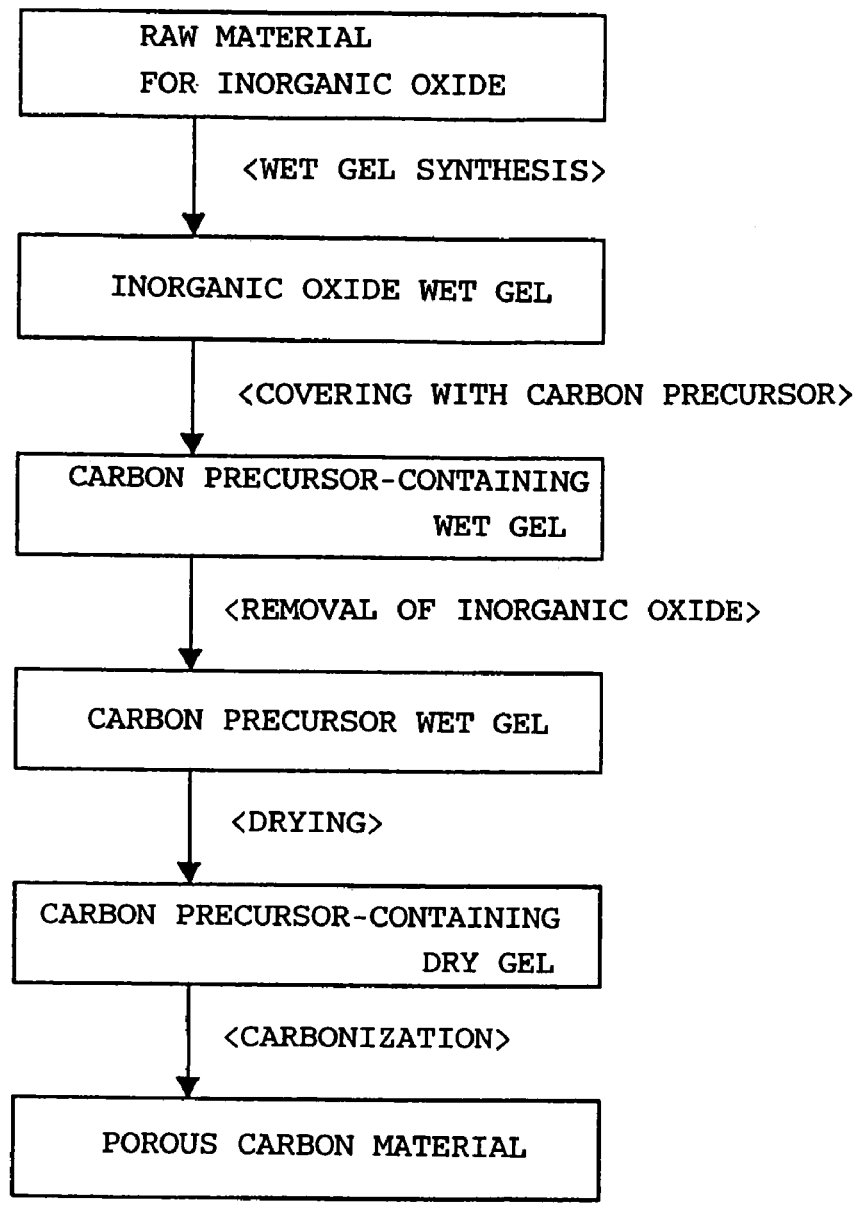
FIG. 7 is a flow chart illustrating an example of the method for manufacturing the porous carbon material obtained in the present invention.

The first method for manufacturing a carbon porous material pertaining to the present invention comprises the basic steps as shown in FIG. 7.

The steps in this method are that a reticulated skeleton of an inorganic oxide is formed, after which any inorganic oxide present as the core of the skeleton is removed from the carbon composite porous material obtained by forming the carbon precursor in this wet gel, which yields a dry gel of a carbon precursor, after which the carbon precursor that forms this reticulated skeleton is carbonized into carbon. Specifically, this method comprises a step of obtaining a carbon precursor-containing wet gel in which the surface of an inorganic oxide is covered with a carbon precursor by imparting a carbon precursor to a wet gel of an inorganic oxide having a reticulated skeleton, a step of removing the inorganic oxide from the carbon precursor-containing wet gel, a step of obtaining a dry gel by drying this carbon precursor-containing wet gel, and a step of obtaining a carbon porous material by carbonizing this dry gel. These are the basic steps, but other known treatments such as solvent replacement, catalyst formation, or surface treatment may be performed as needed.

According to this manufacturing method, a carbon porous material with a large specific surface area can be formed because the reticulated skeleton is formed from a carbon material. Furthermore, an increase in surface area and a low density is achieved because there is a hollow portion in the interior of the reticulated skeleton. As a result, the obtained carbon porous material has a larger specific surface area. This makes possible application to electrode materials or catalyst supports with high reaction efficiency.

(7) Embodiment 7

Figure 8:
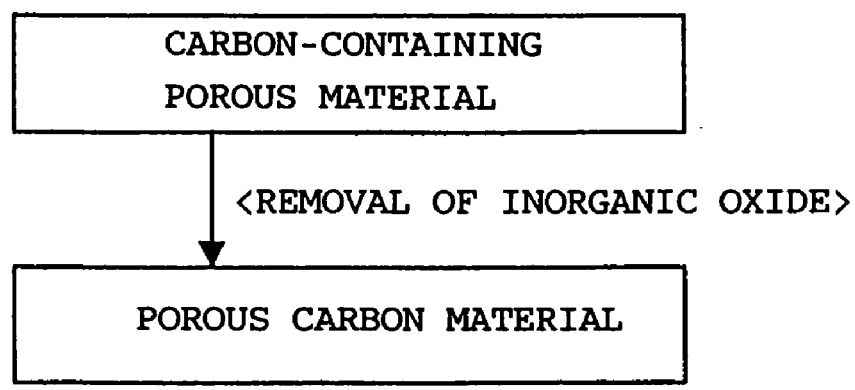
FIG. 8 is a flow chart illustrating another example of the method for manufacturing the porous carbon material obtained in the present invention.

The second method for manufacturing a carbon porous material pertaining to the present invention comprises the basic steps as shown in FIG. 8.

The steps in this method are that a carbon porous material is obtained by removing any inorganic oxide present as a reticulated skeleton (core) from the carbon-containing porous material or the like formed in Embodiment 5 or 6. According to this manufacturing method, since the reticulated skeleton is formed by a carbon material, a carbon porous material having a larger specific surface area can be formed. Further, an increase in surface area can be achieved because there is a hollow portion in the interior of this reticulated skeleton. This makes it possible to obtain a carbon porous material with a low density and large specific surface area, which can be applied as an electrode material or catalyst support with high reaction efficiency.

(8) Embodiment 8

The porous material obtained by the various methods given above can also be heated at 1000° C. or higher as needed, which promotes the graphitization of the carbon material to form graphite. The specific surface area can be increased even further if an activation treatment is performed in an atmosphere of steam or the like, which is performed with an active carbon treatment. The graphitization method may be appropriately selected from among known methods and conditions according to the intended use of the porous material of the present invention.

3. Electrochemical Element

The electrochemical element of the present invention comprises a fuel electrode that produces protons from a fuel and an oxygen electrode that reacts protons with oxygen, which are disposed across from each other with a proton-conductive solid electrolyte in between, with this fuel electrode and/or this oxygen electrode being the porous material of the present invention. Therefore, other than using the porous material of the present invention as an electrode, the constituent components (such as electrolyte, container, and separator) of any known electrochemical element (fuel cell) can be applied.

In the present invention, the product of supporting a catalyst on the porous material of the present invention is used as an electrode. Any known means for forming an electrode can be employed, such as compression molding, injection molding, foam molding, printing, and coating. The electrode thus obtained can be appropriately combined with other constituent components such as electrolyte.

The solid electrolyte used along with the electrode may be an electrolytic material capable of conducting protons. For instance, a fluorine-based polymer film having sulfonic acid groups on side chains; a hydrated oxide such as tungsten oxide or molybdenum oxide; a solid acid complex such as a polyphosphoric acid or polytungstic acid; or the like can be used favorably. These can be formed into a film or sheet as needed.

To combine the porous electrode with an electrolyte, it may be affixed to the electrolyte or applied by printing, coating, or another such method.

When this electrochemical element is used as a fuel cell, the fuel thereof can be hydrogen or a fuel based on an alcohol such as methanol or ethanol, based on an ether such as dimethyl ether or diethyl ether, or based on a hydrocarbon such as methane, ethane, propane, or butane, or can be gasoline or the like. Of these, hydrogen can be used to particularly good advantage.

These fuels may be used by direct reaction at the porous electrode, or may first be reformed to generate hydrogen, and this used in the reaction. Particularly in the case of a direct reaction at the porous electrode, methanol is preferable for an electrochemical element consisting of a fuel cell because of its high reaction efficiency in generating hydrogen.

An embodiment of an electrochemical element that makes use of the porous material of the present invention will now be described through reference to the drawings.

(9) Embodiment 9

The electrochemical element of the present invention will now be described.

Because it has a large specific surface area, the porous material of the present invention affords numerous active sites that participate in the reaction. Therefore, the porous material of the present invention can be applied as the electrode material in cells, capacitors, and other such elements or the support for catalysts that bring about a reaction at an interface. In particular, excellent characteristics can be obtained with an electrochemical element in which an electrode is in contact with an electrolyte. For example, this electrochemical element can be used in fuel cells, air cells, hydrolysis apparatus, electric double-layer capacitors, gas sensors, contaminant gas removal apparatus, and so forth.

Figure 9:
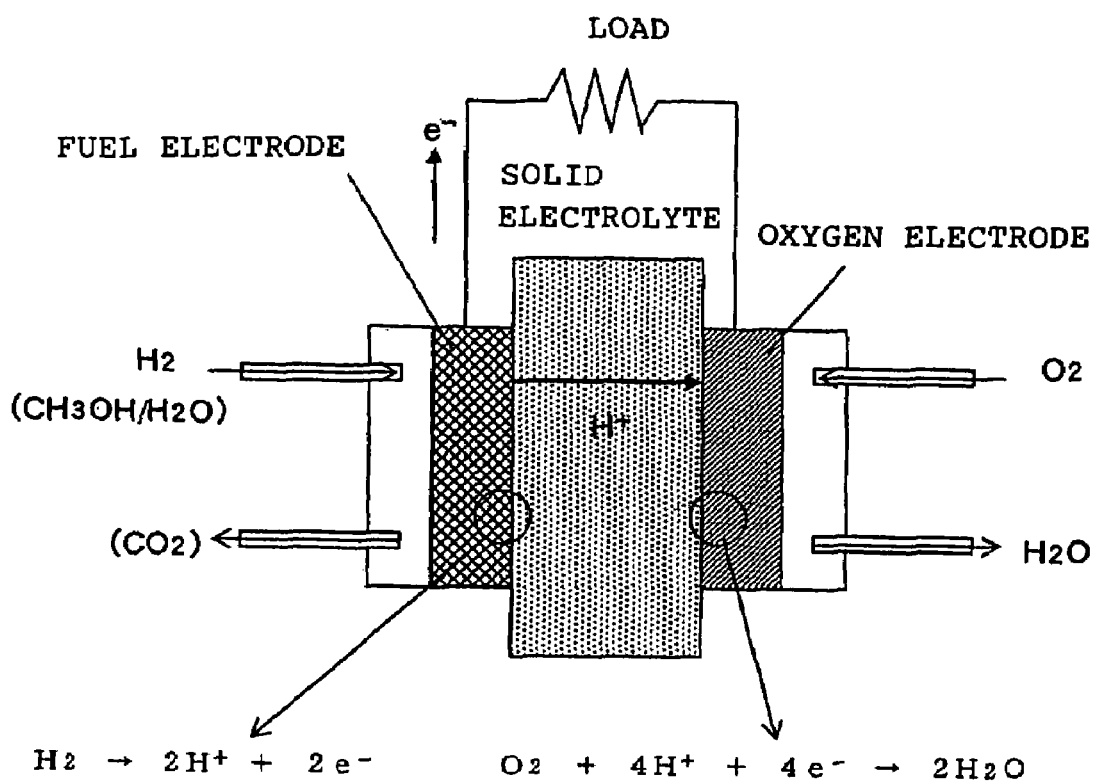
FIG. 9 is a diagram illustrating the general principles of a fuel cell.

In particular, porous electrodes composed of the porous material of the present invention may be disposed across from each other so as to sandwich an electrolyte composed of a proton-conductive solid, as with the fuel cell shown in FIG. 9. When an external circuit is connected to a fuel supply, a catalyst is supported in a porous electrode that reacts with a gas such as hydrogen or oxygen or with a liquid such as methanol. Therefore, if a porous material with a larger specific surface area is used, the amount of catalyst supported can be increased, the likelihood of contact between the reaction fluid and catalyst can be greater, and the reaction efficiency can be higher.

EXAMPLES

Examples and Comparative Examples will be described below to explain the characteristics of the present invention. The scope of the present invention, however, is not limited to the examples.

Example 1

First, a wet gel was synthesized using silica as the inorganic oxide. A raw material liquid prepared by mixing tetramethoxysilane, ethanol, and an ammonia aqueous solution (0.1N) in a molar ratio of 1:3:4 was put in a vessel and gelled into a solid, which yielded a wet gel of silica.

Next, a composite wet gel of a carbon precursor was formed in the wet gel of the inorganic oxide (silica). A raw material aqueous solution was prepared by dissolving resorcinol (0.3 mol/L), formaldehyde, and sodium carbonate in a molar ratio of 1:2:0.01 using water as the solvent, and the above-mentioned silica wet gel was immersed in this solution to impregnate the skeleton of the gel. This product was allowed to stand for 2 days at room temperature and also at about 80° C. This yielded a composite wet gel of a carbon precursor in which a polyphenol-based polymer covered the skeleton of the wet gel of silica.

Next, the above-mentioned composite wet gel in which a carbon precursor was formed in the gel interior was dried. This drying involved replacing the solvent inside the wet gel with acetone, then performing supercritical drying, which yielded a composite dry gel of a carbon precursor in which the solvent had been removed from the interior. As to the supercritical drying conditions, carbon dioxide was used as the drying medium, and after 4 hours at a pressure of 12 MPa and a temperature of 50° C., the pressure was gradually released, and the temperature was raised once atmospheric pressure was reached. This yielded a dry gel. The size was substantially the same before and after drying, with almost no shrinkage. The apparent density was about 220 kg/m$^3$, and the porosity was about 90%. The specific surface area, as measured by BET method (a nitrogen adsorption method), was high at approximately 800 m$^2$/g, and the average particle size was about 15 nm.

Finally, the composite dry gel of a carbon precursor was carbonized to obtain a carbon composite porous material. This composite dry gel was left in a nitrogen atmosphere for 1 hour at 100° C., for 1 hour at 200° C., for 1 hour at 300° C., for 1 hour at 400° C., and for 1 hour at 500° C., and then cooled by being left for 1 hour at 400° C., for 1 hour at 300° C., for 1 hour at 200° C., and for 1 hour at 100° C., after which it was gradually cooled to room temperature. The length of the dry gel before carbonization decreased to approximately 90% after carbonization. The apparent density was about 300 kg/m$^3$, and the porosity was about 80%. The specific surface area, as measured by BET method (a nitrogen adsorption method), was high at approximately 450 m$^2$/g, and the average particle size was about 20 nm.

Comparative Example 1

For the sake of comparison, a wet gel was obtained from just a polyphenol-based polymer of a carbon precursor under the same conditions as in Example 1. The drying was also carried out under the same conditions as in Example 1, which yielded a dry gel of a carbon precursor. The length [of the gel] before drying decreased to approximately 95% after drying. The apparent density was about 150 kg/m$^3$, and the porosity was about 90%. The specific surface area, as measured by BET method (a nitrogen adsorption method), was high at approximately 800 m$^2$/g, and the average particle size was about 15 nm.

This was also carbonized under the same conditions as in Example 1 to obtain a carbon porous material. The length of the dry gel before carbonization decreased to approximately 70% after carbonization. Combined with drying, this represents a shrinkage of about 65%. The apparent density was about 550 kg/mm$^3$, and the porosity was about 40%. The specific surface area, as measured by BET method (a nitrogen adsorption method), was high at approximately 150 m$^2$/g.

Comparative Example 2

For the sake of comparison, a wet gel of silica was obtained under the same conditions as in Example 1. In the drying, the silica wet gel was washed with ethanol (solvent replacement), after which supercritical drying was performed with carbon dioxide to obtain a dry gel of silica. The conditions during supercritical drying were the same as in Example 1. The size was substantially the same before and after drying. The dry gel of silica thus obtained had an apparent density of about 200 kg/m$^3$ and a porosity of about 92%. The specific surface area, as measured by BET method (a nitrogen adsorption method), was high at approximately 600 m$^2$/g, and the average particle size was about 20 nm.

This product was then heated under the same conditions as in the carbonization treatment in Example 1. The length of the dry gel before heating decreased to about 93% after heating. The apparent density was 250 kg/m$^3$, and the porosity was about 90%.

Thus, with a conventional polymer wet gel of a carbon precursor as in Comparative Example 1, there is little shrinkage during drying, but there is much more shrinkage during the carbonization treatment. In contrast, when the silica wet gel was compounded as in Example 1, shrinkage during carbonization was suppressed and a large specific surface area was obtained. The cause of this seems to be that, as shown in Comparative Example 2, there is little shrinkage with a silica dry gel, and the reticulated skeleton of the silica acts as a structural support for the carbon precursor.

Example 2

A dry gel of silica (as the inorganic oxide) was obtained under the same conditions as in Comparative Example 2. This silica dry gel was placed in a quartz tubular furnace, and carbon formation was performed in the vapor phase by pumping propylene through at approximately 800° C. Carbon formation proceeded all the way to the skeleton interior of the silica dry gel. The length of the dry gel before this carbon formation decreased to about 85% after carbon formation, which tells us that shrinkage was greatly suppressed. The apparent density was about 350 kg/cm$^3$, and the specific surface area was high at about 450 m$^2$/g.

Example 3

A composite wet gel of a carbon precursor was obtained under same conditions as in Example 1. This composite wet gel was immersed for 30 minutes at room temperature in hydrofluoric acid, which yielded a wet gel of a carbon precursor. This wet gel was dried under the same conditions as in Example 1 to obtain a dry gel of a carbon precursor. The size was substantially the same before and after this drying.

This dry gel was carbonized under same conditions as in Example 1 to obtain a carbon porous material. The length before carbonization decreased to about 70% after carbonization, but the apparent density was low at about 100 kg/m³, and the specific surface area was high at about 800 m²/g. This carbon porous material was examined by electron microscope, which revealed a hollow structure.

Example 4

The carbon composite porous material produced in Example 2 was immersed for 30 minutes at room temperature in hydrofluoric acid to remove the silica and obtain a carbon porous material. The apparent density thereof was low at about 100 kg/m³, and the specific surface area was high at about 900 m²/kg. This carbon porous material was also examined by electron microscope, which revealed a hollow structure, and it is the effect of this [hollow structure] that is believed to result in the higher specific surface area.

Example 5

Polyacrylonitrile was used as the carbon precursor. The silica wet gel produced in Example 1 was immersed in a 5 wt % acetonitrile solution of polyacrylonitrile to obtain a wet gel in which the carbon precursor covered the gel skeleton. This was dried by the same method as described in Example 1.

The carbon precursor composite dry gel thus obtained was treated for 2 hours at 200° C. and for 2 hours at 400° C., after which the temperature was raised to 600° C. and then lowered to 100° C. to obtain a carbon composite porous material. The length of the gel before this treatment decreased to about 85% after the treatment, which tells us that shrinkage was greatly suppressed. The apparent density was about 350 kg/m³, and the specific surface area was high at about 450 m²/g.

Example 6

The carbon composite porous material produced in Example 5 was immersed in a sodium hydroxide aqueous solution adjusted to a pH of at least 10 to remove the silica, after which solvent replacement was performed with acetone, and then supercritical drying was performed under the same conditions as in Example 1 to obtain a carbon porous material. The size before treatment decreased to about 90% after treatment. The apparent density was low at about 120 kg/m³, and the specific surface area was high at 800 m²/kg.

Example 7

A composite wet gel impregnated with polyamic acid was obtained by immersing the silica wet gel produced in Example 1 in a 1 wt % N-methylpyrrolidone solution of polyamic acid synthesized from pyromellitic anhydride and 4,4'-oxydianiline.

This polyamic acid composite wet gel was made into a polyimide composite dry gel of a carbon precursor by the following two methods.

In the first method, the polyamic acid composite wet gel was immersed in an acetic anhydride and pyridine solution to effect chemical imidation. This polyimide composite wet gel was dried to obtain a polyimide composite dry gel A.

In the second method, the polyamic acid composite wet gel was dried into a composite dry gel. This dry gel was subjected to thermal imidation at 300° C. in a nitrogen atmosphere to obtain a polyimide composite dry gel B.

The resulting polyimide composite dry gels A and B were subjected to carbonization at 600° C. in a nitrogen atmosphere, which yielded a carbonized composite porous material. This composite porous material was further heated at 1200° C., after which the silica skeleton was evaporated and graphitization was promoted at 2000° C. or higher, which yielded a carbon porous material. A carbon porous material could be obtained similarly from both of the composite dry gels A and B.

Example 8

Sodium silicate was subjected to electrodialysis to prepare a silicic acid aqueous solution with a pH of 9 to 10 (silica component concentration in the aqueous solution: 14 wt %). This silicic acid aqueous solution was adjusted to a pH of 5.5, after which it was put into a vessel. It was then gelled at room temperature to obtain a solidified silica wet gel. This silica wet gel was then subjected to a hydrophobic treatment in a 5 wt % isopropyl alcohol solution of dimethyldimethoxysilane, after which drying under reduced pressure as a ordinary drying was performed to obtain a silica dry gel. The drying conditions consisted of 3 hours at a pressure of 0.05 MPa and a temperature of 50° C., after which the pressure was set to atmospheric pressure and the temperature was lowered. The resulting silica dry gel had an apparent density of about 200 kg/m³ and a porosity of about 92%. The specific surface area, as measured by BET method (a nitrogen adsorption method), was approximately 600 m²/g. The average pore diameter was about 15 nm.

A carbon material was then formed in the reticulated skeleton of the resulting silica dry gel.

The silica dry gel was placed in a vacuum film formation apparatus, benzene gas was used to form a discharge plasma at a high frequency of 13.56 MHz and a power of 200 W, and carbon was formed in the silica dry gel, which had been adjusted to a temperature of 200° C., which yielded a carbon composite porous material. X-ray diffraction confirmed that the carbon material thus produced was amorphous. Also, evaluation by Raman spectroscopy confirmed the material to be diamondlike carbon with numerous diamondlike bonds. The apparent density of this carbon composite porous material was about 220 kg/m³, there was little shrinkage, and the specific surface area (by BET method) was high at approximately 600 m²/g.

Example 9

A platinum catalyst was supported by the following method on the carbon composite porous material A produced in Example 1 and on the carbon porous material B produced in Example 3.

A platinum salt was supported by immersing the porous materials A and B in a 3 mmol/L ethanol solution of chloroplatinic acid. Sodium borohydride was added to this at room temperature to support a catalyst composed of platinum particles. The supported amounts of catalyst were approximately 0.2 mg/cm³ and 0.35 mg/cm³, respectively, with the amount being larger with porous material B, which had the larger specific surface area.

Example 10

The catalyst-containing porous material B produced in Example 9 was coated using a binder of a perfluoropolymer having sulfonic acid groups, and a porous electrode was formed. A pair of these electrodes were combined with Nafion, a solid electrolyte polymer, to constitute an electrochemical element.

Hydrogen was supplied to one side of this electrochemical element and air was supplied to the other side, creating a fuel cell. The output voltage was measured and found to be 0.8 V, making it clear that this device operated efficiently as an electrochemical element. This made it clear that the porous carbon material of the present invention can operate as an electrode, and confirmed that the function of a catalyst supported by this porous material can be fully realized.

As discussed above, the present invention is a method for obtaining a carbon-based porous material with low density and a large specific surface area, and provides a carbon composite porous material or a carbon porous material composed of a carbon material suited to the purpose of achieving an efficient electrode reaction or catalyst reaction.

Also, in this manufacturing method, a novel step can be provided in which it is possible to create a porous material composed of a carbon material with a large specific surface area so that the favorable characteristics of the porous material can be fully realized.

Furthermore, an electrochemical element in which the porous material of the present invention is used as an electrode can be used in electrochemical element applications such as a fuel cell, in which a more efficient reaction can be achieved. Thus, the present invention is a method with high industrial value.

The invention claimed is:

1. A method for manufacturing a porous material having a reticulated skeleton in which:
   (1) the reticulated skeleton comprises an interior and a surface component;
   (2) the surface component includes a carbon material; and
   (3) the interior comprises a) empty space, or b) an inorganic oxide and empty space,
   wherein the method comprises in the following order:
   step 1 of obtaining a carbon precursor-containing wet gel by imparting a carbon precursor to a wet gel of an inorganic oxide having a reticulated skeleton;
   step 2 of obtaining a carbon precursor wet gel by removing all or part of the inorganic oxide from the carbon precursor-containing wet gel;
   step 3 of obtaining a carbon precursor-containing dry gel by subjecting the carbon precursor wet gel to supercritical drying; and
   step 4 of obtaining a carbon-containing porous material by subjecting the carbon precursor-containing dry gel to a carbonization treatment.

2. The manufacturing method according to claim 1, wherein the carbon precursor comprises an organic polymer.

3. The manufacturing method according to claim 2, wherein the organic polymer has one or more carbon-carbon unsaturated bonds.

4. The manufacturing method according to claim 2, wherein the organic polymer has one or more aromatic rings.

5. The manufacturing method according to claim 2, wherein the organic polymer is at least one member selected from the group consisting of phenol resins, polyimides, and polyacrylonitriles.

6. The manufacturing method according to claim 1, further comprising a step of supporting a catalyst.

* * * * *

UNITED STATES PATENT AND TRADEMARK OFFICE
CERTIFICATE OF CORRECTION

| | |
|---|---|
| PATENT NO. | : 7,390,474 B2 |
| APPLICATION NO. | : 10/834078 |
| DATED | : June 24, 2008 |
| INVENTOR(S) | : Masa-aki Suzuki |

Page 1 of 1

It is certified that error appears in the above-identified patent and that said Letters Patent is hereby corrected as shown below:

ON THE TITLE PAGE:

Item "(63)" should be inserted as follows:

--Related U.S. Application Data

(63)  Continuation of application No. PCT/JP03/12468, filed on Sep. 30, 2003.--; and Below the data for Item "(63)", insert the following:

--(30)  Foreign Application Priority Data

Sep. 30, 2002   (JP).........2002-286769--.

Signed and Sealed this

Seventeenth Day of March, 2009

JOHN DOLL
*Acting Director of the United States Patent and Trademark Office*